US010660427B2

(12) United States Patent
Nix et al.

(10) Patent No.: US 10,660,427 B2
(45) Date of Patent: *May 26, 2020

(54) PERSONAL ITEM MANAGEMENT APPARATUS

(71) Applicant: THE BIG O, LLC, Dallas, TX (US)

(72) Inventors: Mary Caroline Nix, Dallas, TX (US); Jane Dunne Cooke, Dallas, TX (US)

(73) Assignee: THE BIG O, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,656

(22) Filed: May 22, 2019

(65) Prior Publication Data

US 2019/0269232 A1   Sep. 5, 2019

Related U.S. Application Data

(63) Continuation of application No. 15/966,700, filed on Apr. 30, 2018, now Pat. No. 10,334,938, which is a continuation of application No. 15/251,118, filed on Aug. 30, 2016, now Pat. No. 9,986,814, which is a
(Continued)

(51) Int. Cl.
*A45F 5/00* (2006.01)
*A44B 15/00* (2006.01)
*A44C 5/00* (2006.01)
*F16B 45/02* (2006.01)
*A45F 3/00* (2006.01)
(Continued)

(52) U.S. Cl.
CPC ................ *A45F 5/00* (2013.01); *A44B 15/00* (2013.01); *A44C 5/0038* (2013.01); *A44C 5/0084* (2013.01); *A45F 3/00* (2013.01); *F16B 45/02* (2013.01); *F16M 13/04* (2013.01); *A45C 13/1046* (2013.01); *A45F 2003/006* (2013.01); *A45F 2005/002* (2013.01); *A45F 2005/008* (2013.01); *A45F 2200/0558* (2013.01)

(58) Field of Classification Search
CPC ........ A45F 2005/008; A45F 2005/1013; A45F 5/00; A44C 5/0007; A44C 5/10; A45C 2013/303; Y10T 24/45272; Y10T 24/45319; Y10T 224/267; Y10T 224/219; Y10T 224/22
USPC ........................................................ 224/267
See application file for complete search history.

(56) References Cited

U.S. PATENT DOCUMENTS 2,994,300 A   8/1961  Grahling
3,369,722 A   2/1968  Hetterich
4,964,092 A   10/1990 Brida
(Continued)

OTHER PUBLICATIONS

Facebook posts from https://www.facebook.com/shopoventure dated prior to effective filing date of the application, retrieved on May 3, 2016, 5 pages.
(Continued)

*Primary Examiner* — Adam J Waggenspack
(74) *Attorney, Agent, or Firm* — Haynes and Boone, LLP

(57) ABSTRACT

An embodiment personal item management apparatus includes a wearable band having a fixed circumference that defines a first outer diameter; and a clasp coupled to the wearable band, the clasp having a second outer diameter that is less than the first outer diameter and being adapted to couple a personal item to the wearable band. In an exemplary embodiment, the ratio of the second outer diameter to the first outer diameter is about 0.4.

16 Claims, 6 Drawing Sheets

Related U.S. Application Data continuation of application No. 14/600,319, filed on Jan. 20, 2015, now Pat. No. 9,445,659.

(60) Provisional application No. 61/929,750, filed on Jan. 21, 2014.

(51) Int. Cl.
*F16M 13/04* (2006.01)
*A45C 13/10* (2006.01)

(56) References Cited

U.S. PATENT DOCUMENTS

| | | | | |
|---|---|---|---|---|
| 6,014,950 | A * | 1/2000 | Rogers | A01K 15/026 |
| | | | | 119/710 |
| 6,168,556 | B1 | 1/2001 | Saavedra | |
| 7,908,777 | B1 | 3/2011 | Beardsley | |
| 9,445,659 | B1 | 9/2016 | Nix et al. | |
| 2012/0259362 | A1 * | 10/2012 | Weinland | A61J 17/02 |
| | | | | 606/235 |
| 2013/0265241 | A1 | 10/2013 | Thorn | |
| 2014/0035884 | A1 | 2/2014 | Oh | |
| 2014/0053604 | A1 * | 2/2014 | Newton | A44C 9/02 |
| | | | | 63/15.6 |
| 2014/0318180 | A1 | 10/2014 | Cabe | |
| 2015/0121662 | A1 * | 5/2015 | DeGrouchy | A45F 5/021 |
| | | | | 24/316 |
| 2015/0143846 | A1 * | 5/2015 | Liberman | A44C 5/0084 |
| | | | | 63/3 |

OTHER PUBLICATIONS

Ramsey, Raya, Dallas Holiday Gift Guide: A Good Gift for Scattered Moms and Sloppy Teenagers, D Magazine Dec. 13, 2012, 2 pages.
Non-Final Office Action dated Jan. 11, 2016 in U.S. Appl. No. 14/600,319, USPTO, 13 pages.
Amendment in response to Non-Final Office Action dated Jan. 11, 2016 in U.S. Appl. No. 14/600,319, 18 pages.
Final Office Action dated May 10, 2016 in U.S. Appl. No. 14/600,319, USPTO, 11 pages.
Amendment in response to Final Office Action dated May 10, 2016 in U.S. Appl. No. 14/600,319, 15 pages.
Declaration of Mary Caroline Nix in U.S. Appl. No. 14/600,319, 5 pages.
Declaration of Jane Dunne Cooke in U.S. Appl. No. 14/600,319, 5 pages.
Notice of Allowance dated Aug. 17, 2016 in U.S. Appl. No. 14/600,319, USPTO, 8 pages.
Office Action dated Oct. 27, 2017 in U.S. Appl. No. 15/251,118, USPTO, 15 pages.
Amendment in response to Office Action dated Oct. 27, 2017 in U.S. Appl. No. 15/251,118, USPTO, 8 pages.
Notice of Allowance dated Apr. 2, 2018 in U.S. Appl. No. 15/251,118, USPTO, 5pages.
Office Action dated Sep. 7, 2018 in U.S. Appl. No. 15/966,700, 25 pages.
Amendment in response to Office Action dated Sep. 7, 2018 in U.S. Appl. No. 15/966,700, 29 pages.
Notice of Allowance dated Apr. 3, 2019 in U.S. Appl. No. 15/966,700, 7 pages.

* cited by examiner

PERSONAL ITEM MANAGEMENT APPARATUS

CROSS-REFERENCE TO RELATED APPLICATIONS

This application is a continuation of U.S. patent application Ser. No. 15/966,700, filed Apr. 30, 2018, which is a continuation of U.S. patent application Ser. No. 15/251,118, filed Aug. 30, 2016, which is a continuation of U.S. patent application Ser. No. 14/600,319, filed Jan. 20, 2015, which claims the benefit of the filing date of, and priority to, U.S. Application No. 61/929,750, filed Jan. 21, 2014, the entire disclosures of which are hereby incorporated herein by reference.

BACKGROUND

Individuals often carry a number of personal items with them as they go about their day. Such personal items include, for example, keys, a key fob, a coin purse, a credit card case, a bottle of sanitizer, a framed photograph, and so on. As technology advances and portable electronic devices get smaller and smaller, the personal items may also include mobile or smart phones, a hands-free device (e.g., Blue tooth device), a portable music player (e.g., iPod), and so on. Some of these personal items may include their own customized case, such as glasses, sunglasses, and so on.

In order to transport and temporarily store all of these person items, an individual may rely on a purse, a handbag, a backpack, or the like. Unfortunately, trying to quickly locate and access a desired personal item inside, for example, a purse can be challenging.

The present disclosure is directed to an apparatus, such as a personal item management apparatus, that overcomes one or more of the shortcomings in the prior art.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

Figure 1:
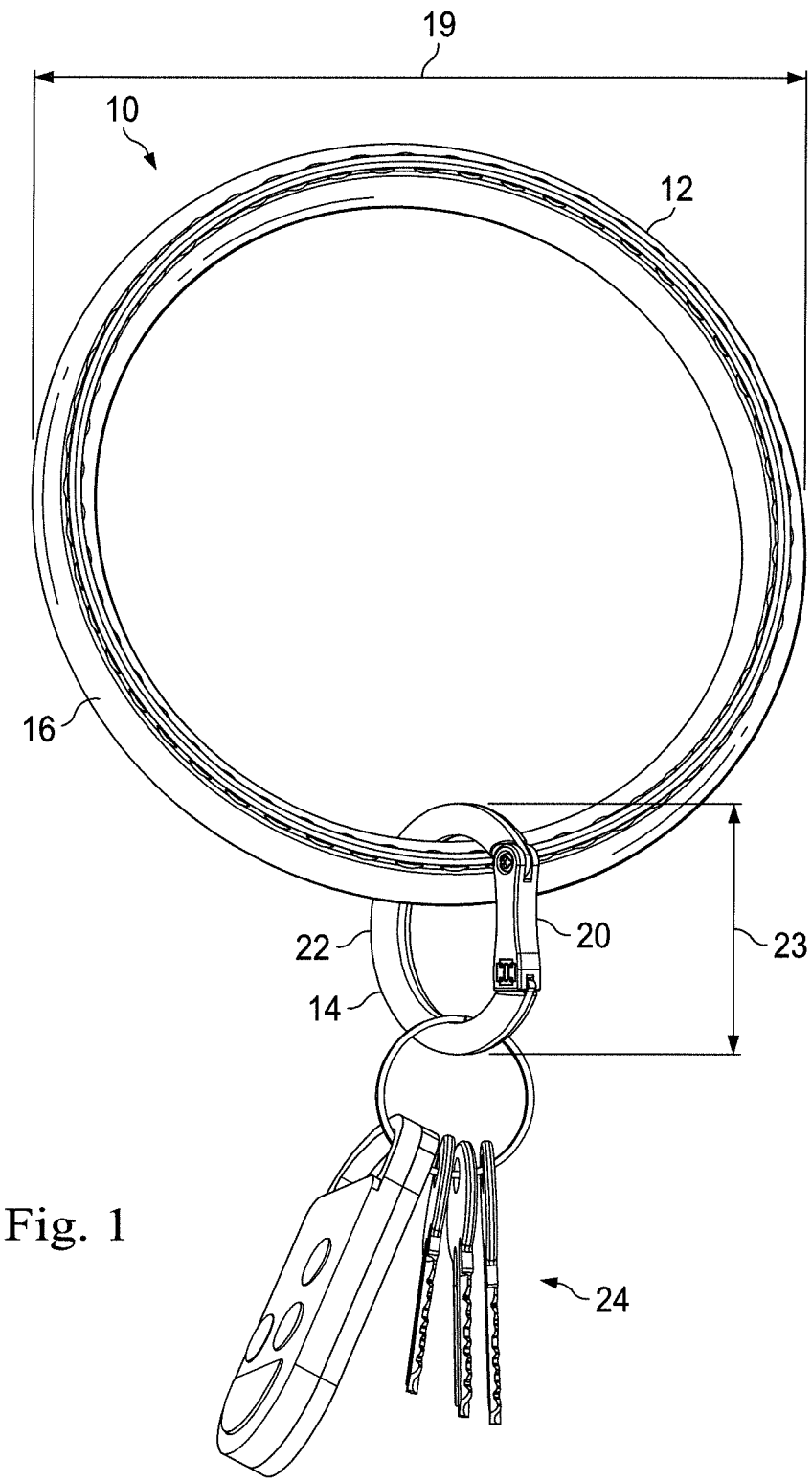
FIG. 1 illustrates a personal item management apparatus, according to an exemplary embodiment of the present disclosure.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In an exemplary embodiment, and as illustrated in FIG. 1, a personal item management apparatus is generally referred to by the reference numeral 10 and includes a ring, or wearable band 12, and a clasp 14 coupled to the band 12. As will be more fully explained below, the apparatus 10 aims to give individuals (e.g., women) a comfortable, hands-free way to stay organized and carry their personal items. The apparatus 10 also permits the personal items to be accessed, removed, and returned without difficulty and without causing damage to fingernails or nail polish thereon.

Figure 2:
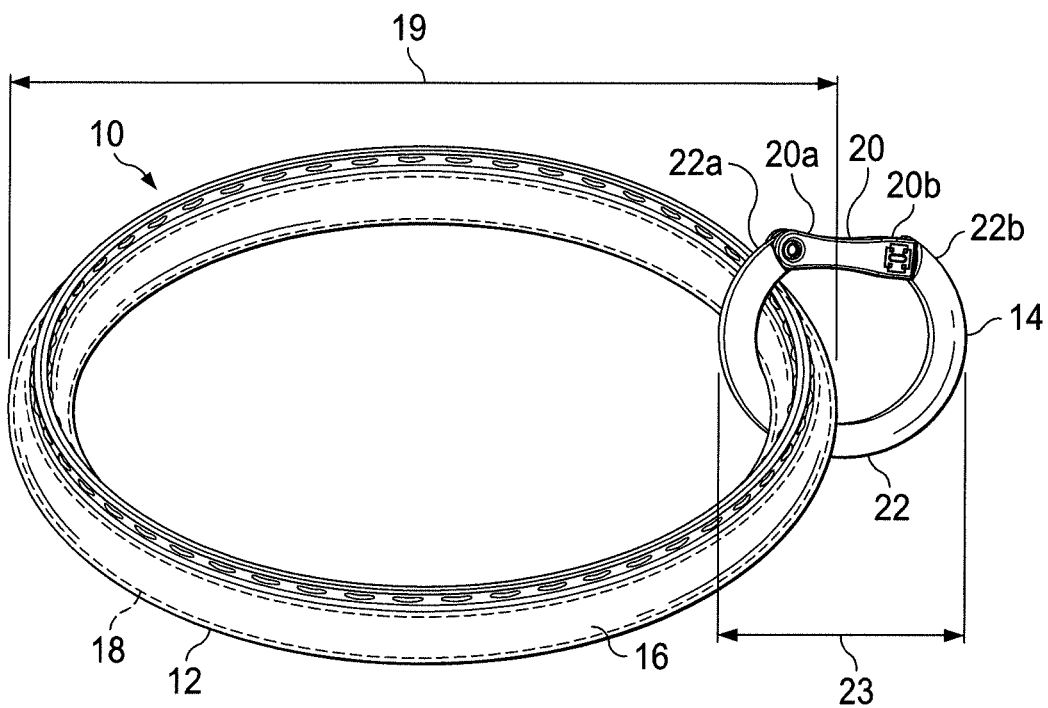
FIG. 2 illustrates another view of the personal item management apparatus of FIG. 1, according to an exemplary embodiment of the present disclosure.
Figure 3:
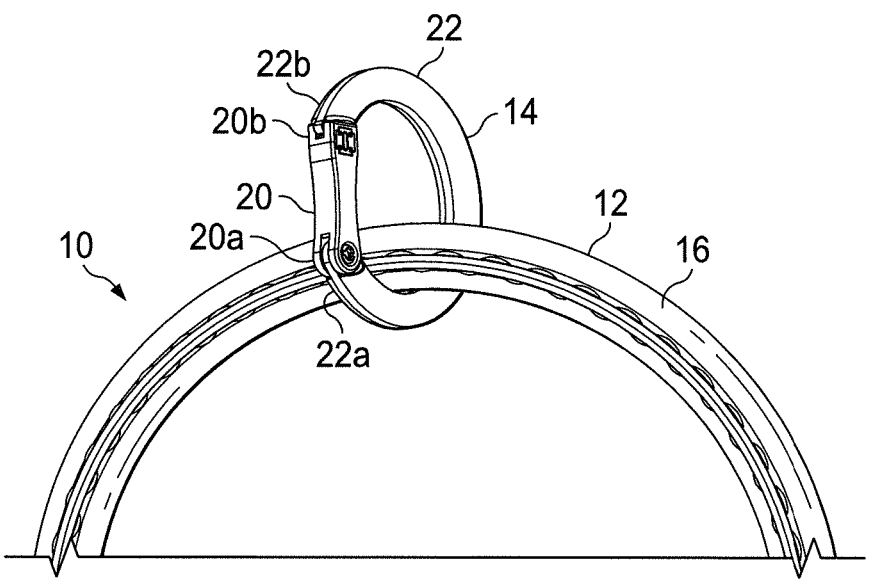
FIG. 3 illustrates a portion of the personal item management apparatus of FIG. 1, according to an exemplary embodiment of the present disclosure.

As shown in FIGS. 1-3, the band 12 may be formed from a cover 16 disposed around an inner core 18 (shown in FIG. 2). In an exemplary embodiment, the cover 16 may be formed from a variety of suitable materials such as, for example, leather, artificial leather, rubber, plastic, and so on. In an exemplary embodiment, the cover 16 is held in place around the inner core 18 by stitching. However, the cover 16 may be otherwise secured using, for example, an adhesive.

In an exemplary embodiment, the cover 16 may be dyed or otherwise provided with one or more aesthetically pleasing colors, patterns, designs, words, phrases, images, and so on. In an exemplary embodiment, the cover 16 and the stitching used to secure the cover 16 in place may be the same or different colors. In an exemplary embodiment, the cover 16 may be formed from waterproof or water resistant materials or appropriately treated to impart these qualities. In an exemplary embodiment, the cover 16 has a fixed circumference that defines a first outer diameter 19.

In an exemplary embodiment, the band 12 is sized and dimensioned to slide over the wrist of a wearer. Therefore, the band 12 may be worn like a bracelet. In an exemplary embodiment, the band 12 is sized and dimensioned to fit snugly, but comfortably, around the arm of a wearer. Therefore, the band 12 may be worn like an armband. By way of example, the band 12 may be temporarily secured around the bicep or forearm of wearer. In an exemplary embodiment, the band 12 is sized and dimensioned so that the band 12 is unable to slide beyond the forearm or elbow of the wearer.

In an exemplary embodiment, the inner core 18 may be flexible in order to permit the shape of the band 12 to adapt to the size of the individual wearing the band 12. In an exemplary embodiment, the inner core 18 is a two-part apparatus comprising of a hollow rubber tube with a spring inside. Even so, the inner core 18 may be otherwise suitable formed. In an exemplary embodiment, the inner core 18 may be formed from a relatively rigid or non-flexible material.

In an exemplary embodiment, the clasp 14 may include a gate 20 that is pivotably attached to a clasp body 22. In an exemplary embodiment, the gate 20 has a first end 20a that is pivotably coupled to one end 22a of the clasp body 22 and an opposing second end 20b that moves relative to another end 22b of the clasp body 22. In an exemplary embodiment, the clasp 14 may be formed from a variety of suitable materials such as, for example, stainless steel. Like the cover 16, the clasp 14 may be provided with one or more aesthetically pleasing colors, patterns, designs, words, phrases, images, and so on. In an exemplary embodiment, the clasp 14 is adapted to couple a personal item to the wearable band 12.

In an exemplary embodiment, the clasp 14 resembles a capital "D." In other words, the clasp body 22 has an arcuate shape while the gate 20 is linear or straight. Even so, other shapes and configurations are contemplated. For example, the clasp 14 may be round, oval, rectangular, and so on. In one or exemplary embodiments, the arcuate shape of the clasp body 22 defines a second outer diameter 23. In an exemplary embodiment, the second outer diameter 23 is less than the first outer diameter 19. In an exemplary embodiment, the ratio of the second outer diameter 23 to the first outer diameter 19 is about 0.4.

In an exemplary embodiment, the gate 20 is spring-loaded. As such, the gate 20 is biased into a closed position as shown in FIG. 1. However, upon application of sufficient force, the gate 20 is able to pivot inwardly towards the clasp body 22 and into an open position. When in the open position, the clasp 14 is able to receive a personal item such as, for example, a set of keys 24 depicted in FIG. 1. Once the biasing force is released, the gate 20 is able to pivot back into the closed position to temporarily, yet releasably, store the personal item. In an exemplary embodiment, instead of being spring-loaded the gate 20 may be held in place through a friction fit, a locking mechanism, and so on. In an exemplary embodiment, an audible click is heard when the gate 20 obtains the closed position.

While the personal item in FIG. 1 is depicted as the set of keys 24, the clasp 14 may also receive a key fob, a coin purse, a credit card case, a bottle of sanitizer, a framed photograph, a charm, a lanyard, a lipstick or lip gloss case, a mobile or smart phone, a hands-free device (e.g., Blue tooth device), a portable music player (e.g., iPod), a pair of glasses or sunglasses or their case, and so on. Indeed, any personal item with a small ring, a loop of material, and so on, may be securely held by the clasp 14 for easy future access.

While only a single clasp 14 has been illustrated in FIG. 1, a plurality of the clasps 14 may and often will be used simultaneously in practical applications. Indeed, several of the clasps 14 may be attached to the band 12 in order to hold a variety of different personal items. Moreover, the personal items on each clasp 14 may be selectively removed, used, and then replaced upon the band 12 as needed by the wearer by manipulating or releasing the gate 20.

Figure 4:
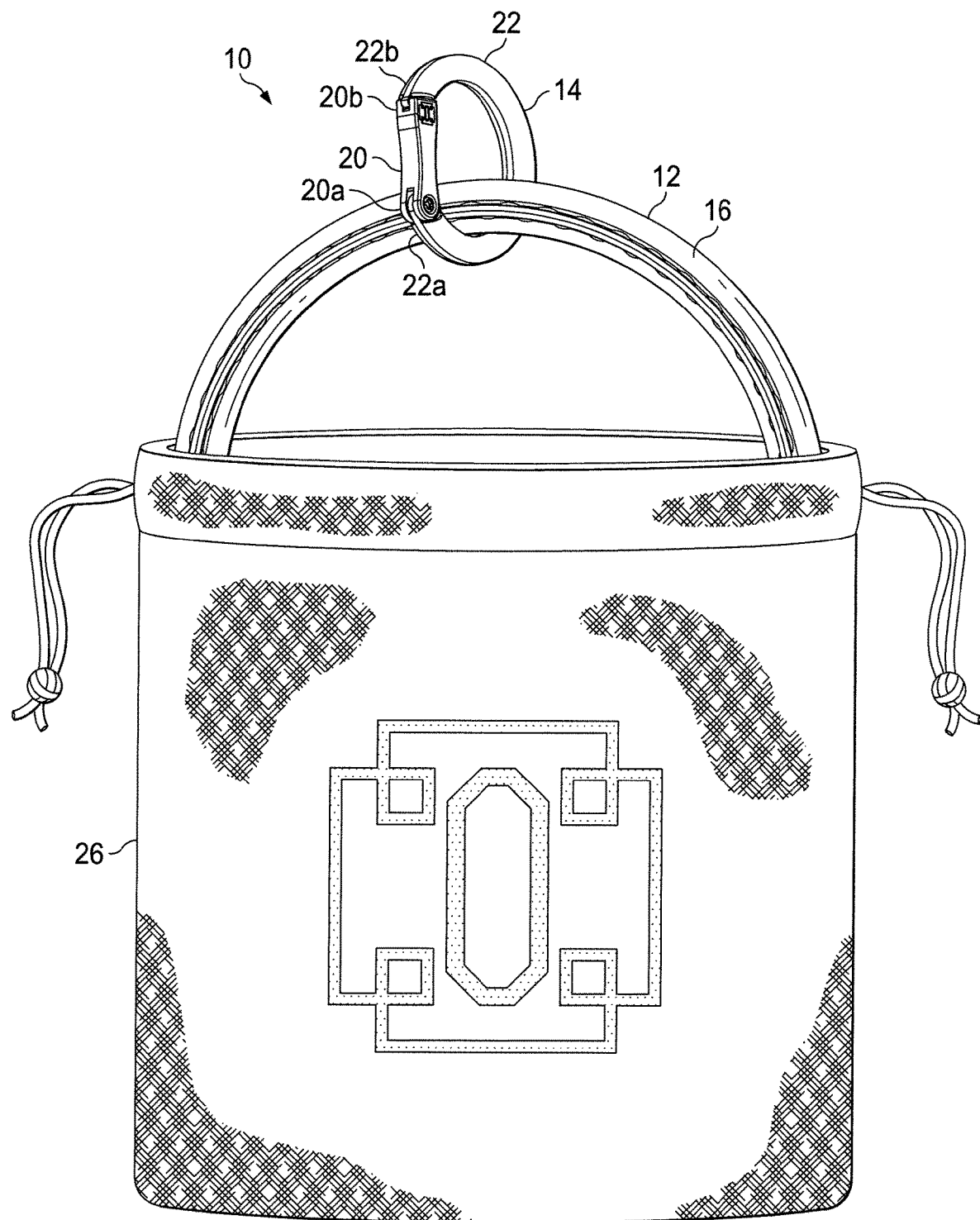
FIG. 4 illustrates the personal item management apparatus of FIG. 1 and a bag used to store the personal item management apparatus of FIG. 1, according to an exemplary embodiment of the present disclosure.

Referring now to FIG. 4, the apparatus 10 may be stored or sold within a decorative case or bag 26. In an exemplary embodiment, the bag 26 is made from a soft but durable material that can be cinched closed at the top using a drawstring. In an exemplary embodiment, the bag 26 is sized and dimensioned to store a single apparatus 10 or several apparatuses simultaneously.

Figure 5:
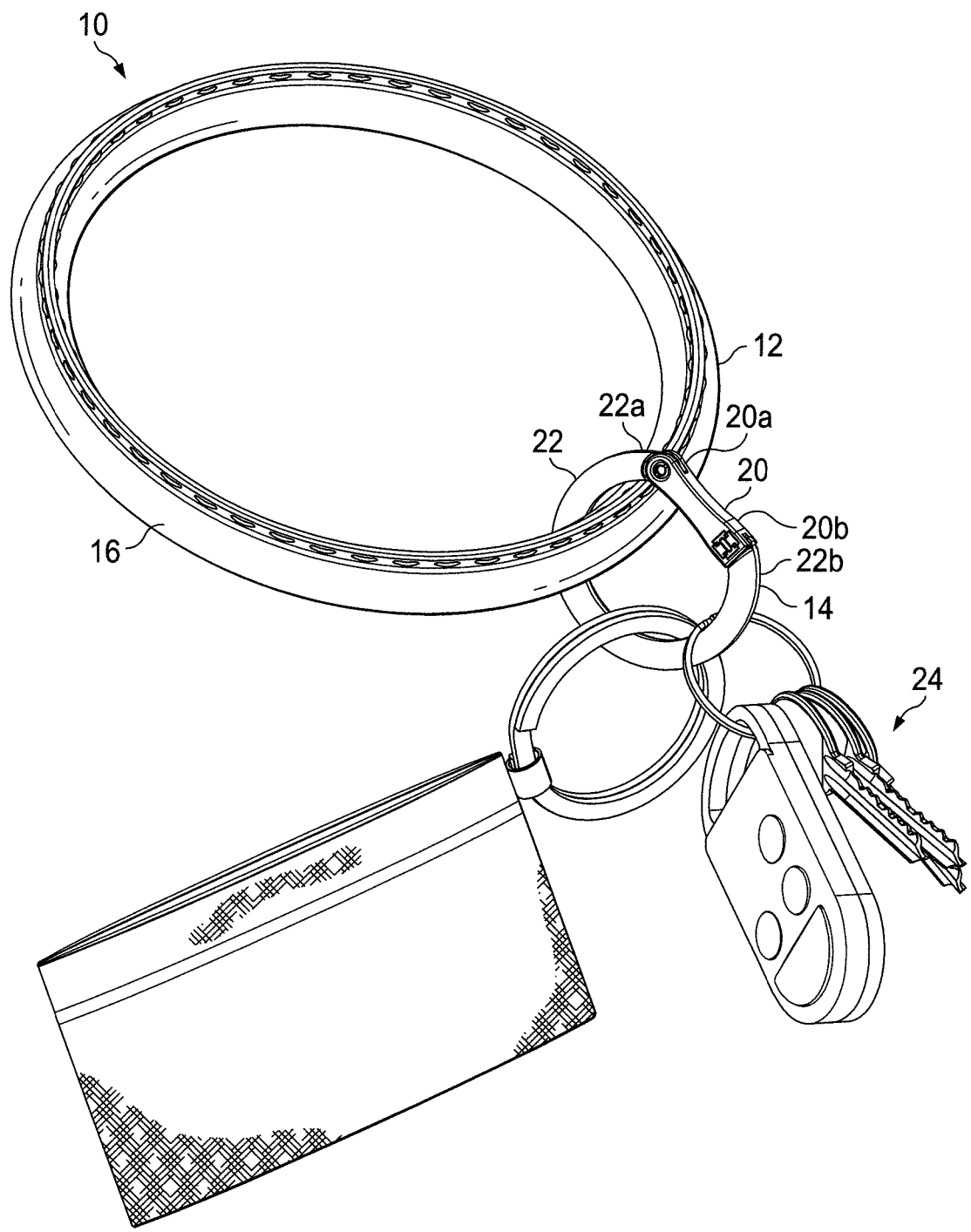
FIG. 5 illustrates the personal item management apparatus of FIG. 1 bearing several personal items, according to an exemplary embodiment of the present disclosure.

As shown in FIG. 5, in an embodiment one of the clasps 14 may be used to secure several of the personal items. In other embodiments, each of the clasps 14 may be tasked with holding a single personal item. In an exemplary embodiment, the band 12 may receive one clasp 14 holding a single personal item and another clasp 14 holding several personal items.

Figure 6:
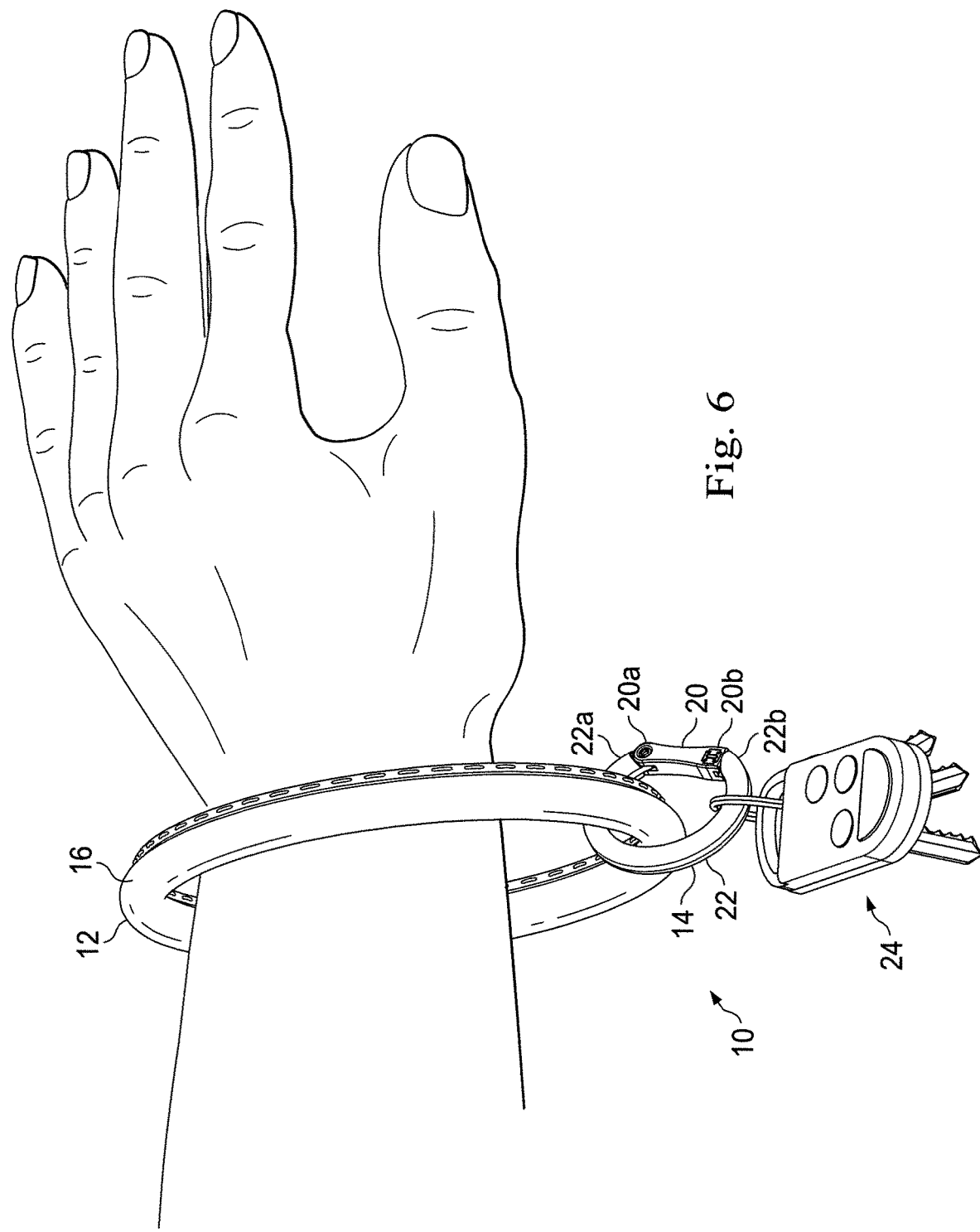
FIG. 6 illustrates the personal item management apparatus of FIG. 1 while being worn about a user's wrist, according to an exemplary embodiment of the present disclosure.

Referring now to FIG. 6, the band 12 from the apparatus 10 may be slid over the wrist of a wearer, or user, while the personal items, such as the keys 24, are being held in place by the clasp 14. As shown, the band 12 is somewhat larger than the wrist of the wearer such that the band 12 may be comfortable disposed on the wrist like a bracelet.

Figure 7:
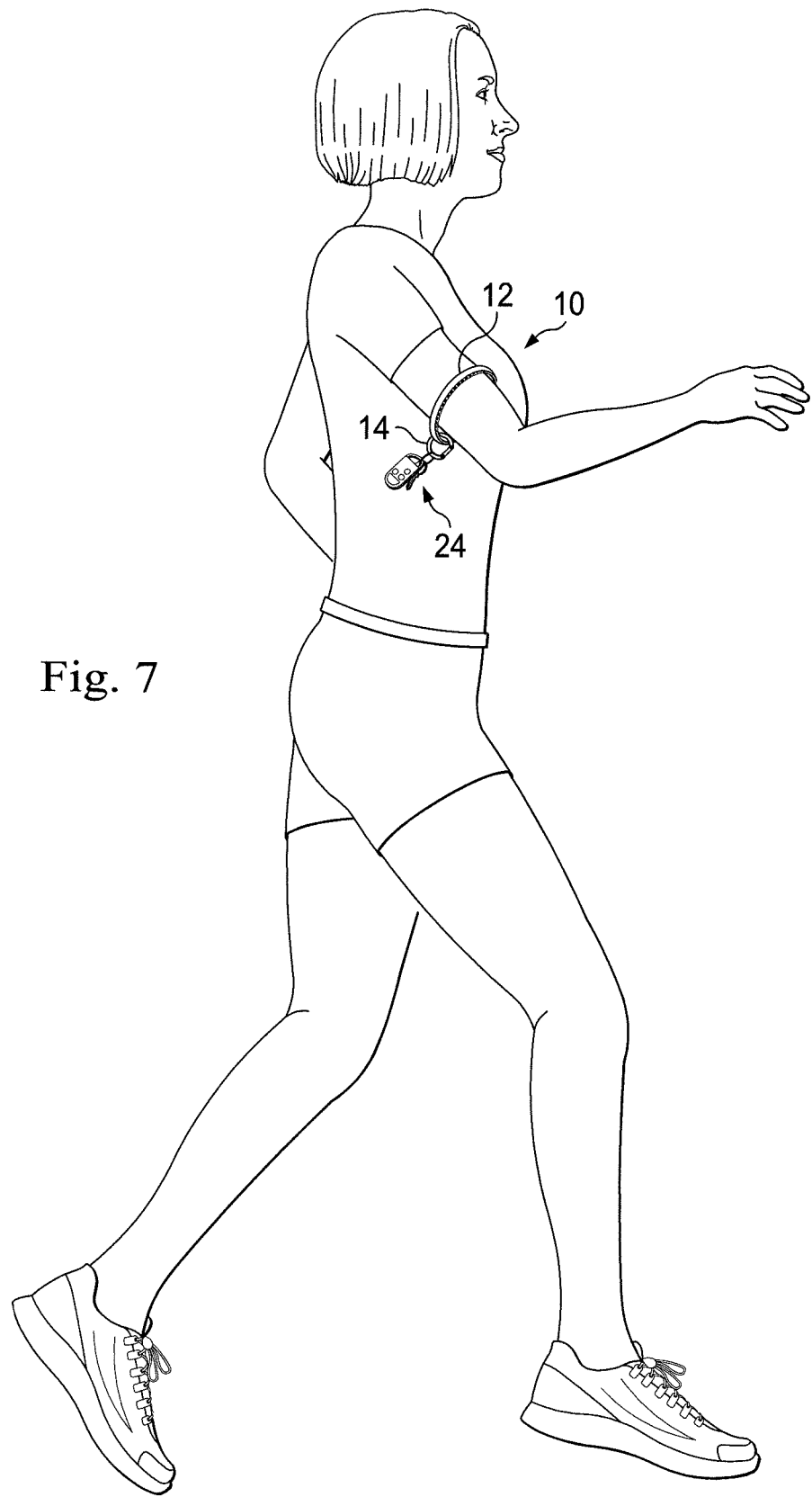
FIG. 7 illustrates the personal item management apparatus of FIG. 1 while being worn about a user's arm, according to an exemplary embodiment of the present disclosure.

As shown in FIG. 7, the apparatus 10 may be slid further up the arm until snugly fit around the bicep or upper arm of the wearer. Because the band 12 is flexible, the band 12 is able to adapt to the contour of the wearer's arm and remain in place. Indeed, once comfortably positioned around the arm, the band 12 is able to remain in place during daily activity like walking. In an exemplary embodiment, the band 12 may even stay in place during more strenuous activities like jogging or running.

In an exemplary embodiment and when the apparatus 10 is not in use around the wrist or arm, one of the clasps 14 of the apparatus 10 may be used to secure the apparatus 10 to a belt loop on a pair of pants, a loop on a purse or backpack, the ring found on a wristlet or tote, and so on. Therefore, the apparatus 10 is multi-functional relative to basic key rings using a slit ring design.

From the foregoing, it should be recognized that the apparatus 10 gives individuals a comfortable, hands-free way to stay organized and carry desired items (e.g., keys). Those items are readily accessible relative to when they are stored or held in a handbag or purse where they can be lost in clutter. In an exemplary embodiment, the band 12 is sufficiently durable to receive and hold several clasps 14 having one or more personal items thereon. In an exemplary embodiment, the apparatus 10 uses self-locking clasps 14 instead of the traditional split-ring used to hold, for example, keys.

An apparatus has been described that includes a wearable band having a fixed circumference that defines a first outer diameter; and a clasp coupled to the wearable band, the clasp having a second outer diameter that is less than the first outer diameter and being adapted to couple a personal item to the wearable band. In an exemplary embodiment, the ratio of the second outer diameter to the first outer diameter is about 0.4. In an exemplary embodiment, the wearable band includes a flexible inner core; and a cover surrounding the inner core. In an exemplary embodiment, the cover includes a leather material. In an exemplary embodiment, the clasp includes a clasp body forming an arcuate shape that defines the second outer diameter; and a gate movable between a closed position and an open position, the gate having a first end pivotably coupled to one end of the clasp body and an opposing second end that moves relative to another end of the clasp body; wherein when the gate is in the closed position, the opposing second end of the gate is coupled to the another end of the clasp body; and wherein when the gate is in the open position, the opposing second end of the gate extends towards the clasp body. In an exemplary embodiment, the wearable band is adapted to be worn around a user's wrist. In an exemplary embodiment, the wearable band is adapted to be worn around a user's bicep. In an exemplary embodiment, the cover comprises at least one of a waterproof material and a water resistant material.

An apparatus has been described that includes a wearable band including a cover that surrounds a flexible inner core, the band having a fixed first outer diameter; and a clasp that couples to the wearable band, the clasp having a second outer diameter that is less than the first outer diameter; wherein the ratio of the second outer diameter to the first outer diameter is about 0.4. In an exemplary embodiment, the first outer diameter defines a fixed circumference. In an exemplary embodiment, the clasp includes a clasp body forming an arcuate shape that defines the second outer diameter; and a gate movable between a closed position and an open position, the gate having a first end pivotably coupled to one end of the clasp body and an opposing second end that moves relative to another end of the clasp body; wherein when the gate is in the closed position, the opposing second end of the gate is coupled to another end of the clasp body; and wherein when the gate is in the open position, the opposing second end of the gate extends towards the clasp body. In an exemplary embodiment, the wearable band is adapted to be worn around a user's wrist. In an exemplary embodiment, the wearable band is adapted to be worn around a user's bicep. In an exemplary embodiment, the cover comprises at least one of a waterproof material and a water resistant material.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims.

What is claimed is:

1. A personal management apparatus, comprising:
   a wearable band having a non-adjustable, fixed circumference that defines a first outer diameter; and
   a clasp coupled to the wearable band, the clasp defining a second outer diameter that is less than the first outer diameter;
   wherein the wearable band comprises:
      a donut-shaped inner core; and
      a cover surrounding the inner core, the cover defining an outer surface;
   wherein a portion of the inner core of the wearable band is radially sandwiched between radially-spaced first and second portions of the outer surface of the cover of the wearable band;
   wherein the first portion of the outer surface of the cover of the wearable band defines the first outer diameter;
   wherein the second portion of the outer surface of the cover of the wearable band is generally circular in shape, and is sized so that the wearable band is adapted to be worn around a user's wrist and/or bicep;
   wherein at least the first portion of the outer surface of the cover of the wearable band extends along the fixed circumference of the wearable band;
   wherein a first inner region is defined by the cover of the wearable band;
   wherein the first inner region is generally circular in shape;
   wherein the clasp extends through the first inner region so that the wearable band extends around a portion of the clasp;
   wherein a second inner region is at least partially defined by the clasp;
   wherein the wearable band extends through the second inner region so that the clasp extends around a portion of the wearable band;
   wherein the cover of the wearable band further comprises a stitching having a circular shape,
      the stitching being adjacent the outer surface defined by the cover,
      the stitching defining radially-spaced first and second edge portions of the outer surface at which the stitching is adjacent the outer surface,
      the stitching forming a circular seam that in its entirety is spaced from the inner core in a parallel relation,
      the personal management apparatus being configured so that the parallel spacing between the circular seam in its entirety and the inner core is maintained.

2. The personal management apparatus of claim 1, wherein the clasp comprises:
   a clasp body forming an arcuate shape that defines the second outer diameter; and
   a gate movable between a closed position and an open position, the gate having a first end pivotably coupled to one end of the clasp body and an opposing second end that moves relative to another end of the clasp body;
   wherein, when the gate of the clasp is in the open position, the opposing second end of the gate extends towards the clasp body; and
   wherein the gate of the clasp is spring loaded so that:
      the gate of the clasp is biased into the closed position; and
      the gate of the clasp is configured to be moved from the closed position to the open position in response to an application of a force against the gate.

3. The personal management apparatus of claim 2 wherein, when the gate of the clasp is in the closed position, the opposing second end of the gate is locked to the another end of the clasp body.

4. The personal management apparatus of claim 3 wherein, when the gate is in the open position and the application of the force against the gate is released, the gate of the clasp self locks by moving from the open position to the closed position in which the opposing second end of the gate is locked to the another end of the clasp body.

5. The personal management apparatus of claim 3, wherein the opposing second end of the gate and the another end of the clasp body are configured so that an audible click is heard when the gate obtains the closed position in which the opposing second end of the gate is locked to the another end of the clasp body.

6. The personal management apparatus of claim 1, wherein the ratio of the second outer diameter to the first outer diameter is about 0.4.

7. The personal management apparatus of claim 1, wherein the cover comprises a leather material.

8. The personal management apparatus of claim 1, wherein the cover comprises at least one of a waterproof material and a water resistant material.

9. A personal management apparatus, comprising:
   a wearable band having a non-adjustable, fixed circumference that defines a first outer diameter; and
   a clasp coupled to the wearable band, the clasp defining a second outer diameter that is less than the first outer diameter;
   wherein the wearable band comprises:
      a donut-shaped inner core; and
      a cover surrounding the inner core, the cover defining an outer surface;

wherein a portion of the inner core of the wearable band is radially sandwiched between radially-spaced first and second portions of the outer surface of the cover of the wearable band;

wherein the first portion of the outer surface of the cover of the wearable band defines the first outer diameter;

wherein the second portion of the outer surface of the cover of the wearable band is generally circular in shape, and is sized so that the wearable band is adapted to be worn around a user's wrist and/or bicep;

wherein at least the first portion of the outer surface of the cover of the wearable band extends continuously and uninterruptedly along the fixed circumference of the wearable band in its entirety;

wherein a first inner region is defined by the cover of the wearable band;

wherein the first inner region is generally circular in shape;

wherein the clasp extends through the first inner region so that the wearable band extends around a portion of the clasp;

wherein a second inner region is at least partially defined by the clasp;

wherein the wearable band extends through the second inner region so that the clasp extends around a portion of the wearable band;

wherein the cover of the wearable band further comprises a stitching having a circular shape, the stitching being adjacent the outer surface defined by the cover, the stitching defining radially-spaced first and second edge portions of the outer surface at which the stitching is adjacent the outer surface, the stitching forming a circular seam that in its entirety is spaced from the inner core in a parallel relation, the personal management apparatus being configured so that the parallel spacing between the circular seam in its entirety and the inner core is maintained.

10. The personal management apparatus of claim 9, wherein the clasp comprises:

a clasp body forming an arcuate shape that defines the second outer diameter; and a gate movable between a closed position and an open position, the gate having a first end pivotably coupled to one end of the clasp body and an opposing second end that moves relative to another end of the clasp body;

wherein, when the gate of the clasp is in the open position, the opposing second end of the gate extends towards the clasp body; and wherein the gate of the clasp is spring loaded so that:
the gate of the clasp is biased into the closed position; and
the gate of the clasp is configured to be moved from the closed position to the open position in response to an application of a force against the gate.

11. The personal management apparatus of claim 10 wherein, when the gate of the clasp is in the closed position, the opposing second end of the gate is locked to the another end of the clasp body.

12. The personal management apparatus of claim 11 wherein, when the gate is in the open position and the application of the force against the gate is released, the gate of the clasp self locks by moving from the open position to the closed position in which the opposing second end of the gate is locked to the another end of the clasp body.

13. The personal management apparatus of claim 11, wherein the opposing second end of the gate and the another end of the clasp body are configured so that an audible click is heard when the gate obtains the closed position in which the opposing second end of the gate is locked to the another end of the clasp body.

14. The personal management apparatus of claim 9, wherein the ratio of the second outer diameter to the first outer diameter is about 0.4.

15. The personal management apparatus of claim 9, wherein the cover comprises a leather material.

16. The personal management apparatus of claim 9, wherein the cover comprises at least one of a waterproof material and a water resistant material.

\* \* \* \* \*